(No Model.)
C. B. RICE.
GATE ROLLER.
No. 252,253. Patented Jan. 10, 1882.
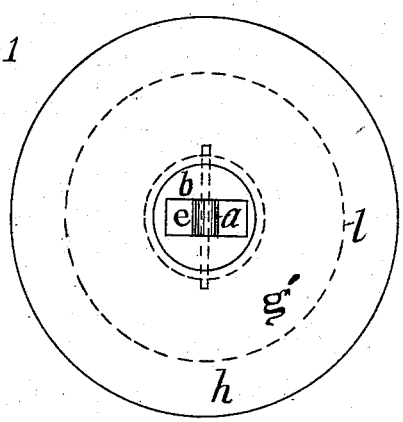
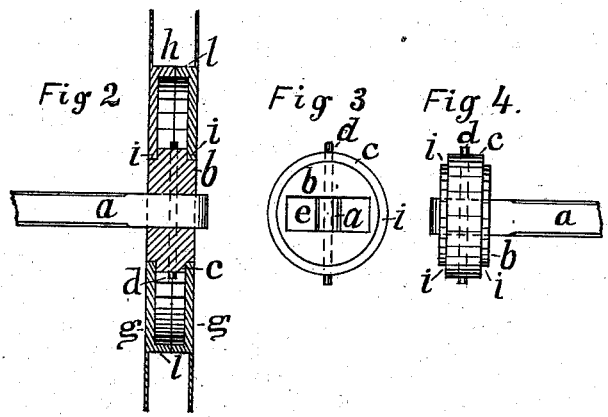
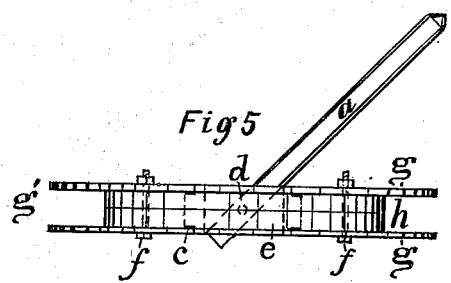
Witnesses
Wm Zimmerman
F. A. Herring
Inventor.
Charles B. Rice
By Gridley & Co
Attys.

UNITED STATES PATENT OFFICE.

CHARLES B. RICE, OF EVANSTON, ILLINOIS.

GATE-ROLLER.

SPECIFICATION forming part of Letters Patent No. 252,253, dated January 10, 1882.

Application filed April 4, 1881. (No model.)

*To all whom it may concern:*

Be it known that I, CHARLES B. RICE, of Evanston, in the county of Cook and State of Illinois, have invented certain new and useful Improvements in Gate-Rollers; and I hereby declare the following to be a full, clear, and exact description thereof, which will enable others skilled in the art to which my invention relates to make and use the same, reference being had to the accompanying drawings, forming a part hereof, and in which—

Figure 1 represents a side view of my improved gate-roller. Fig. 2 represents a vertical and longitudinal central section. Fig. 3 represents an end view of the hub $b$ and its bolt $a$. Fig. 4 represents a side view of a part of the bolt with the hub $b$ pivoted thereto; and Fig. 5 represents an exterior view of the roller $g'$ and the bolt $a$, attached and moved to one side the full limit of its motion.

Like letters of reference indicate like parts.

My invention relates to that class of gate-rollers more especially adapted to form gates; and it consists in the combination and construction of the several parts of the roller, as hereinafter described and claimed.

In the drawings, $a$ represents a bolt, one end of which may be formed into a spike or point, so as to be driven into a post, or it may be screw-threaded for the same purpose, and the other or outer end of said bolt is made square or flat. Upon the outer end of said bolt is mounted a short hub or axle, $b$, provided with an oblong slot, $e$, and through the center of said slot and bolt, near its end, is passed a bolt, $d$, so arranged as to allow the bolt $a$ to play freely back and forth in the slot $e$. The hub $b$ is provided with one or more bands, $c$, cast with it, so as to form shoulders $i$, one at each end, and upon said hub are placed annular disks $g$, provided with openings to fit into and work freely in the said shoulders $i$. Each of said disks $g$ is provided with an annular rim, $l$, at the distance of about an inch from its exterior circumference and of a height so that when the disks $g$ are placed upon each other and on the hub $b$ they will join and form the groove $h$. The disks $g\ g$ are then held together by bolts $f f$, and thus form the gate roller or wheel $g'$.

In use the bolt $a$ is so driven that the slot $e$ of the hub $b$ shall be horizontal or parallel to the gate-bars and their motion. The gate-bar upon which the gate is suspended lies and moves in the groove $h$, and the roller $g'$ turns upon the hub $b$ in the grooves $i$. When the gate is drawn back and forth and is balanced on the wheel $g'$ it is swung around to open and close it, and carries the roller $g'$ around and keeps it parallel with itself, the wheel turning on the vertical pivot $d$.

A gate-roller so constructed will always hold the gate in a vertical plane and prevent it from wabbling laterally, as is the case with gate-rollers made with a ball-and-socket joint; and it can also be made very light, yet strong, when constructed and arranged to operate as here shown.

Having thus described my invention, what I claim as new, and desire to secure by Letters Patent, is—

A farm-gate roller consisting of the disks $g\ g$, provided with rims $l$, and central openings adapted to fit on a hub and united together by pins, in combination with the hub $b$, provided with a horizontally-longitudinal slot, $e$, and shoulders $i$, mounted and pivoted upon a bolt, $a$, by a pin, $d$, passing vertically through the center of said slot, all constructed and arranged to operate substantially as herein shown and described.

CHARLES B. RICE.

Witnesses:
N. COWLES,
WM. ZIMMERMAN.